United States Patent
Purdy et al.

(10) Patent No.: US 9,871,702 B2
(45) Date of Patent: Jan. 16, 2018

(54) SERVICE INFORMATION MODEL FOR MANAGING A TELECOMMUNICATIONS NETWORK

(71) Applicant: CENX, Inc., Ottawa (CA)

(72) Inventors: Christopher Purdy, Ottawa (CA); Evelyne Roch, Gatineau (CA); David Schubert, Ottawa (CA); Peter Strong, Kanata (CA)

(73) Assignee: CENX, INC., Ottawa (CA)

( * ) Notice: Subject to any disclaimer, the term of this patent is extended or adjusted under 35 U.S.C. 154(b) by 103 days.

(21) Appl. No.: 15/046,039

(22) Filed: Feb. 17, 2016

(65) Prior Publication Data
US 2017/0237628 A1    Aug. 17, 2017

(51) Int. Cl.
| | |
|---|---|
| G06F 15/16 | (2006.01) |
| H04L 12/24 | (2006.01) |
| G06F 17/24 | (2006.01) |
| G06F 17/30 | (2006.01) |
| G06F 17/27 | (2006.01) |

(52) U.S. Cl.
CPC ............ *H04L 41/14* (2013.01); *G06F 17/248* (2013.01); *G06F 17/2705* (2013.01); *G06F 17/30321* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 6,208,345 B1 * | 3/2001 | Sheard | G06F 8/34 709/201 |
| 7,143,152 B1 | 11/2006 | Elman et al. | |
| 7,330,722 B1 * | 2/2008 | Kirtley | H04L 41/08 455/423 |
| 8,468,228 B2 | 6/2013 | Covino et al. | |

(Continued)

OTHER PUBLICATIONS

International Search Report and Written Opinion for International Appl. No. PCT/IB2017/050919, Canadian Intellectual Property Office, dated Apr. 13, 2017, 8 pages.

(Continued)

*Primary Examiner* — Natisha Cox
(74) *Attorney, Agent, or Firm* — Sterne, Kessler, Goldstein & Fox P.L.L.C.

(57) ABSTRACT

Systems, methods, and computer program embodiments are disclosed for providing network management services for a telecommunications network. In an embodiment, a request may be received for a service provided by an operations support system (OSS). Data may be retrieved from a network management database based on the received request. The network management database may store a plurality of network management data, and the stored data may be correlated to a service information model that defines a plurality of base network entities used to represent the architecture of the network. An information model template may then be read by the OSS that specifies one or more provider-specific network entities that extend the base network entities defined by the service information model. The retrieved data may then be operated on by the OSS, and the resulting output may be customized based on the provider-specific network entities of the information model template.

27 Claims, 8 Drawing Sheets

(56) References Cited

U.S. PATENT DOCUMENTS

| | | |
|---|---|---|
| 8,868,725 B2 | 10/2014 | Samba |
| 2006/0047806 A1 | 3/2006 | Bannach |
| 2007/0130192 A1* | 6/2007 | Bolder ............... H04L 41/0806 |
| 2010/0115490 A1* | 5/2010 | Wilcock .................. G06F 8/70 |
| | | 717/104 |

OTHER PUBLICATIONS

Monteiro, M.E., et al. "Ontology Based Model for the ITU-T Recommendation G.805: Towards the Self-Management of Transport Networks," *International Journal of Computer Science and Information Technology*, vol. 2, No. 2, Apr. 2010.

* cited by examiner

SERVICE INFORMATION MODEL FOR MANAGING A TELECOMMUNICATIONS NETWORK

BACKGROUND

Field

This disclosure generally relates to telecommunications network management and operations support.

Background

Network data usage has increased rapidly in recent years. Network service users demand higher bandwidth with better quality and secure connectivity. Modern network service providers operate local, regional, and nationwide networks to provide connectivity to users. These networks are built with a variety of equipment to perform various tasks, and such equipment may be manufactured by multiple vendors. Each piece of equipment may be complex enough to handle hundreds to thousands of simultaneous connections, and different pieces of equipment may be widely dispersed across a region. Wireless base stations, for example, may be geographically distributed across a city to optimize coverage and efficiency.

To meet user demand, network operators are investing heavily in network infrastructure and new applications to increase network capacity and maintain consistent performance. Today's network infrastructure is evolving faster than ever due to significant innovations in high-speed mobile broadband, cloud-based applications, network functions virtualization (NFV), software-defined networking (SDN), carrier Ethernet, and IP virtual private networks (VPNs). These advances in network technologies are impacting the underlying networks upon all network service providers. Service providers introduce 4G technology, cloud-based infrastructure, NFV, and SDN to better scale and manage their services and infrastructure assets. These dynamics have been fueling a transformation from TDM-based bandwidth services to carrier Ethernet and layer 3 IP services such as IP-VPN and Multiprotocol Label Switching (MPLS) connectivity.

For example, NFV and SDN are two emerging technologies that are expanding the transformation of service provider network services. NFV uses virtualization technologies to design, deploy, and manage network services. NFV decouples the network functions, such as firewall, network address translation (NAT), domain name service (DNS), load balancing, WAN optimization, and intrusion detection, from dedicated hardware appliances so that these network functions can execute in software and processes running within virtual machines. SDN separates control and forwarding functions, centralizes management, and programs network behavior using well-defined interfaces. SDN enables network control to become directly programmable, and the underlying infrastructure can be abstracted from applications and network services. With SDN and NFV, service providers can provide differentiated, revenue-generating service offerings to their end customers while reducing operational costs and simplifying network management.

Another extension is Voice over Long Term Evolution (VoLTE), which allows service providers to offer voice communication services over their high speed 4G LTE infrastructures that was traditionally used for data only, maximizing the value of service providers' investment. VoLTE is moving into mainstream production globally. As service providers are deploying VoLTE, service providers are also leveraging NFV technology to build out their VoLTE infrastructure more efficiently and cost effectively.

These disruptive technologies lead to significant challenges for network service providers because network transformation is complex and labor-intensive. Service providers need to build out network infrastructure leveraging emerging technologies while also operating within their existing infrastructure and maintaining the high quality of service end users expect.

Accommodating new technologies can increase the complexity of network operations. The increased operational complexity may include, for example, lengthy circuit turn-up time, inventory inaccuracy, challenges in accurately resolving faults, or unreliable performance for high value applications such as video and VoLTE. To handle this complexity, today's mobile, wire line, and cloud data center service providers are looking for new ways to design, implement, and manage their network infrastructures.

Conventional operations support systems (OSSs) can no longer simply be tweaked to support end-to-end management of increasingly complex network infrastructures. Conventional OSSs are systems used by service providers to manage their networks (e.g., telephone networks or data networks). Conventional OSSs provide functionality including network inventory, fault management, service provisioning, and network configuration. Conventional OSSs often utilize well-known, existing network management models to manage their network elements in service providers' network infrastructures. Well-known examples of network management models include FCAPS and OAMPT.

FCAPS stands for fault, configuration, accounting, performance, and security, which are categories that define network management tasks. FCAPS is the International Organization for Standardization (ISO) Telecommunications Management Network model and framework for network management. Fault management is related to identifying, correcting, and logging network problems (i.e., faults) to minimize network downtime. Configuration management is related to gathering configurations from network devices and applying configurations to network devices. Configurations may be hardware and programming changes, including the addition, deletion, or modification of network equipment and programs in the communications network. Accounting management focuses on gathering network usage statistics so that individual users, departments, or business units can be properly billed for accounting purposes. Performance management is concerned with managing the overall performance of the network and ensuring that network performance remains at acceptable levels. Security management is related to protecting the network against unauthorized access.

Another well-known network management model is OAMPT. OAMPT stands for operations, administration, maintenance, provisioning, and trouble shooting. OAMPT describes five types of network management tasks: operational management, administration, maintenance, provisioning, and troubleshooting. Operational management is concerned with day-to-day normal network operations. Administration includes support procedures for day-to-day operations. The support procedures can include, for example but not limited to, common passwords, equipment and tools access, and customer service report. Maintenance focuses on configuration and hardware changes in response to system deterioration. These changes include, for example but not limited to, scheduling service provider maintenance, standard network equipment configuration changes, routine equipment checks, hardware changes, and software/firmware upgrades. Provisioning is related to configurations that add, update, and remove network hardware equipment and network services. Troubleshooting involves diagnosis of network failures.

Regardless of the management model used, existing OSSs need to be highly customized to adapt to differing network architectures of different service providers. Providers are constantly adding new services and infrastructure, and OSS software constantly needs to be updated to continue to provide useful network management applications. This often requires collaboration between separate network engineers and software developers and can lead to increased costs and development complexity.

SUMMARY

Systems, methods, and computer program embodiments are disclosed for providing network management services for a telecommunications network. In an embodiment, a request may be received for a service provided by an operations support system (OSS). Data may be retrieved from a network management database based on the received request. The network management database may store a plurality of network management data, and the stored data may be correlated to a service information model that defines a plurality of base network entities used to represent the architecture of the network.

An information model template may then be read by the OSS. The information model template may specify one or more provider-specific network entities that extend the base network entities defined by the service information model. Each provider-specific network entity may also include one or more custom attributes, and the retrieved data may contain data values associated with the custom attributes. One or more of the base network entities may be instantiated based on the retrieved data, and each base entity instance may be correlated to a provider-specific network entity specified by the information model template. The custom attributes of each provider-specific entity and associated retrieved values may then be linked to the corresponding base entity instances.

The base entity instances may be operated on to produce a data output, and the data output may be customized based on the linked custom attributes and associated retrieved data values. Finally, the customized data output may be presented for display to a user.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example Service Information Model

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
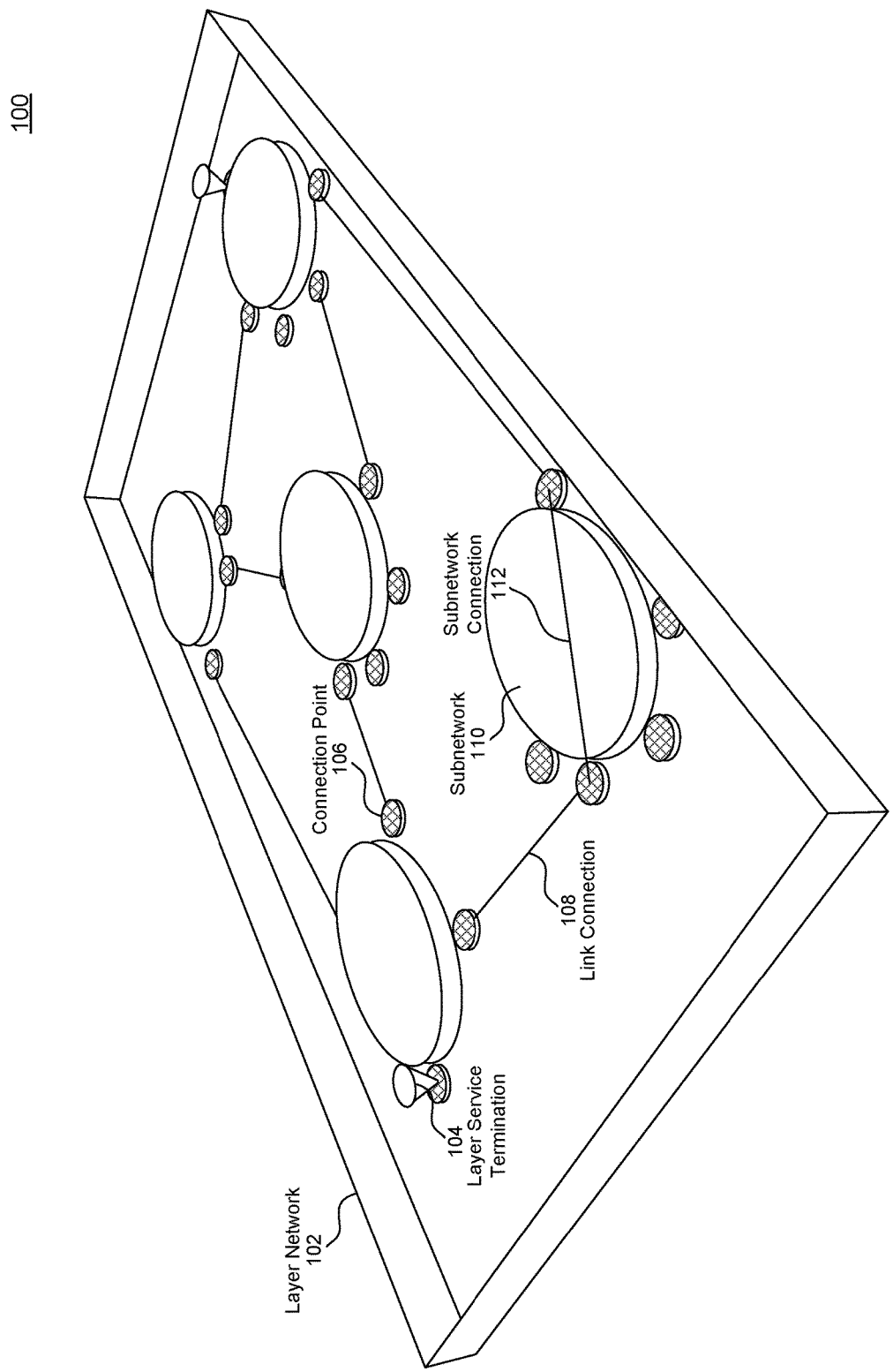
FIG. 1 is a diagram illustrating an example information model used to represent the architecture of a telecommunications network, according to an embodiment.

FIG. 1 is a diagram illustrating an example information model 100 used to represent the architecture of a telecommunications network, according to an embodiment. As demand for network connectivity rises, service providers are employing new network technologies and infrastructure to ensure performance and consistency of service. As a result, provider networks are becoming increasingly complex and diverse. While providers often use similar technologies, each provider structures and configures their networks differently. For example, each provider may set their own standards of how their networks are physically connected, specify configuration standards and naming conventions for various network elements, and define services being provided by each network.

To manage a provider's networks, the provider may make use of an operations support system (OSS) that provides various network management services and applications, such as inventory management, network configuration, service provisioning, and network visualization tools. The OSS must maintain an information model that holds a view of the provider's network architecture, resources provided by the network, and services provided by and crossing the network.

Because of the complexity and diversity of today's networks, the need has arisen for a generalized information model that can apply to all network architectures and technologies. This type of information model may implement an abstract set of base objects and associations between objects that can be used to represent provider-specific objects within their networks. This enables a service provider to adapt to network changes without modifying the underlying information model.

Operations support systems are often provided by OSS vendors to different service providers. A service provider in this context may be a network service provider, and Internet service provider, and enterprise network administrator, or any individual or organization managing a telecommunications network. OSS vendors face the challenge of developing a generalized information model that can apply to different service providers and customizing the model and OSS services to meet the needs of each provider.

Service information model 100 is an example generalized information model that may be used to represent various network architectures of different service providers and may include entities used to represent different types of network elements, components, and services of the network. For example, service information model may include entities such as a layer network 102, a layer service termination point 104, a connection point 106, a link connection 108, a subnetwork 110, and a subnetwork connection 112. Layer network 102 may represent various physical, link, network, and transport layers that exist in a service provider's network architecture. Service information model 100 may include multiple layer networks, and layers may be linked via layer service termination points 104 and/or connection points 106.

Service information model 100 may be implemented in OSS software as base classes or objects that represent entities 102-112. The base classes are often implemented as abstract classes, allowing developers and network engineers to specify subclasses that extend the functionality of the base classes, while being adapted to specific network objects in a provider's network. For example, a base class may be defined for subnetwork connection 112. Subclasses may then be defined that extend from the subnetwork connection class, for example, a wavelength selection switch at a dense wavelength-division multiplexing (DWDM) layer of the network, a virtual local area network (VLAN) switch at an Ethernet layer of the network, and other network elements that may be represented by extending the base functionality of a subnetwork connection. These subclasses may include additional attributes, naming conventions, and constraints specified by a managing service provider.

Once the appropriate subclasses have been defined for a provider's network, network management applications and services may be adapted and refined to account for the provider-specific subclasses. For example, a service provisioning module of the OSS may be rewritten or extended to operate on instantiated subclasses, such as a VLAN switch, rather than an instance of a subnetwork connection itself. This allows for customization of OSS applications and services to meet the needs of each individual provider.

However, this customization may require extensive modifications or additions to software code of each network management application and service to operate on the provider-specific objects. This can lead to high development costs to customize each OSS function, and future changes to network infrastructure or services provided require additional software development and testing time. To maintain this model, OSS vendors must employ large teams of developers and network engineers for professional services and software customization purposes, and service providers thus become reliant on OSS vendors or internal development teams to quickly adapt existing software to infrastructure and configuration changes. Embodiments described with respect to FIG. 2 address these issues by allowing service providers to define provider-specific network entities while minimizing required modifications to OSS software.

Example System

Figure 2:
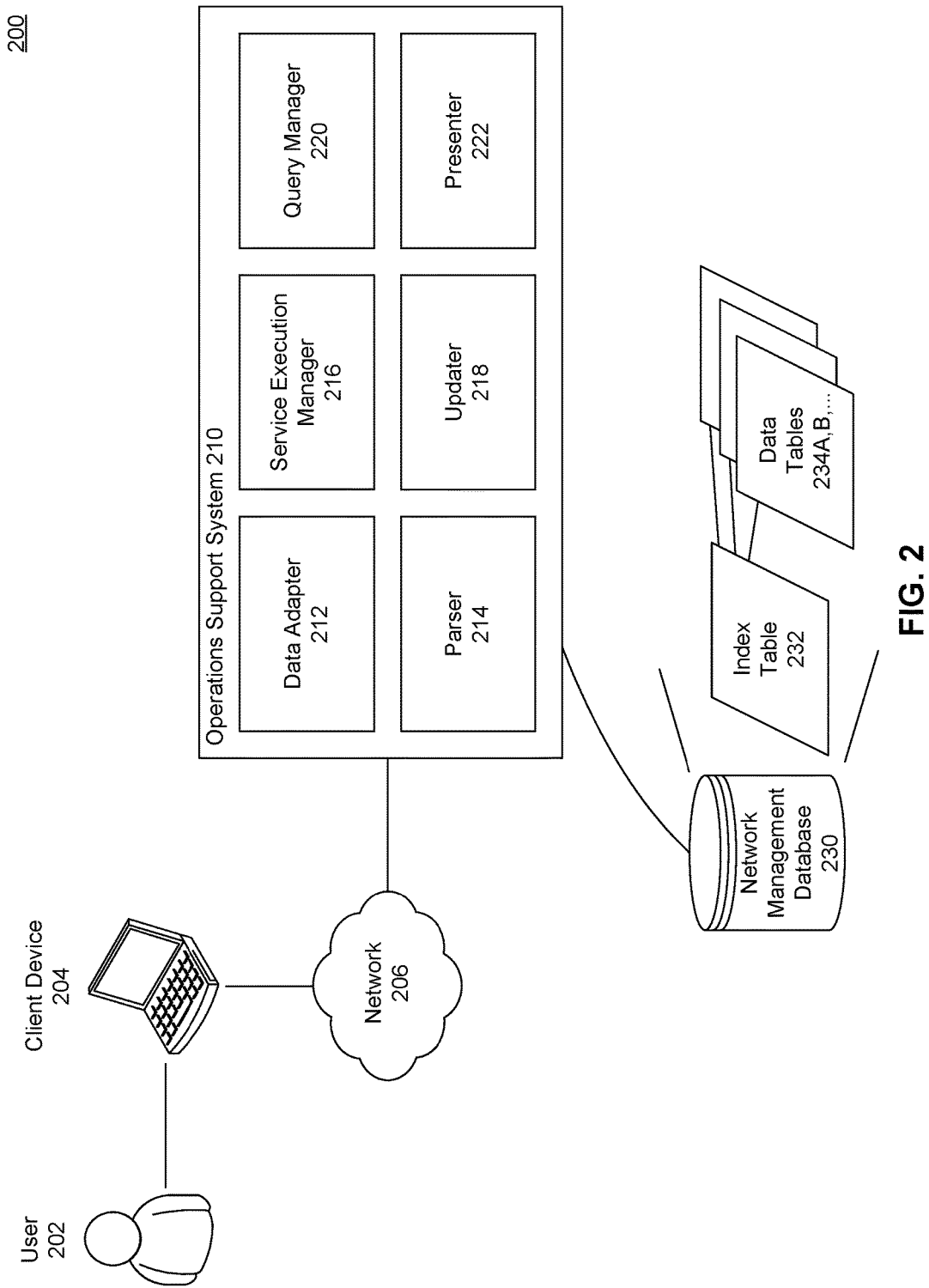
FIG. 2 is a diagram illustrating an example system for providing network management services for a telecommunications network, according to an embodiment.

FIG. 2 is a diagram illustrating an example system 200 for providing network management services for a telecommunications network, according to an embodiment. System 200 may include a user 202, a client device 204, a network 206, an operations support system (OSS) 210, and a network management database 230. Client device 204 may be coupled to network 206, and network 206 may be any type of computer network capable of communicating data, such as for example, a wired or wireless local area network or a wide area network (e.g., the Internet), or any combination thereof. Client device 204 may be coupled to operations support system 210 via network 206. OSS 210 may be implemented on one or more computing devices including, but not limited to, at least one computer having a processor and memory, a computer cluster, server, server farm, or cloud computing system.

In an embodiment, a user 202, such as a network operator of a service provider, may use OSS 210 to manage and configure a service provider's network. OSS 210 may be accessed via client device 204. Client device 204 may, for example, include a web browser that enables a user to interact with OSS 210. The web browser may respond to user input by sending a hypertext transfer protocol (HTTP) request to OSS 210 via network 206. In another example, the user may interface with client device 204 through a native application instead of a web browser, such that the native application communicates with OSS 210. Client device 204 may be any type of computing device, such as and without limitation, a desktop, laptop, or mobile device.

OSS 210 may include data adapter 212, parser 214, service execution manager 216, updater 218, query manager 220, and presenter 222. In an embodiment, OSS 210 may be coupled to a network management database 230. Network management database 230 may store a plurality of network management data, such as but not limited to, network configuration data, operational state data, and network service information. Network management database 230 may be any type of structured data store, including a relational, document-oriented, graph-oriented, or object-oriented database.

In an embodiment, the data stored in network management database 230 may support and/or conform to a generalized service information model. As described with respect to FIG. 1, the service information model may include a set of base entities that can be used to represent the network architecture of and services provided by different service providers. In an embodiment, network management database 230 may implement a data schema that supports storage of network management data according to the service information model. For example, data tables 234A, B, . . . may correspond to different entities defined by the service information model.

In addition to the entities described with respect to FIG. 1, in an embodiment, the service information model employed by OSS 210 may include a container entity. A container may be used to represent a physical facility, piece of equipment, or logical grouping of equipment used in the network. A container may also represent features, functions, and capabilities that are provided by such a facility or equipment. In this manner, a container is a generalized entity that allows the logical topology of a network to be grounded in physical elements distributed throughout the network. For example, a container may represent a geographically located network site or physical router. Data related to the network site or physical router may then be grouped and analyzed across various layers of the network. In an embodiment, a container may include other containers. For instance, a network site might may include a cell site router, which may both be represented by a container entity.

In an embodiment, data adapter 212 may normalize collected network management data according to the service information model for storage in network management database 230. Data may collected by various processes implemented within or outside of OSS 210 that process data from, for example and without limitation, network configuration files, manually created architectural specifications, network analytics processes, or network equipment monitors. This data may be stored in network management database 230 and used by various network management applications and services of OSS 210.

As illustrated in FIG. 2, network management database 230 may store the data in a plurality of different data tables 234A, B, . . . . To improve performance of database queries and updates, application database 230 may also include an index table 232. In an embodiment, updater 218 may query index table 232 to assist with data insertions and updates, and query manager 220 may query index table 232 to assist with data retrieval. The index table may point to entries in data tables 234, which may include complete individual data records. Or, in an embodiment where the database is de-normalized, the index table may itself include the individual data records in part or in full. In this way, index table 232 may be used to improve performance of database queries and updates.

In an embodiment, a request may be received by OSS 210, for example by query manager 220, from a network operator, such as user 202. The request may specify a service to be executed by OSS 210. A service may refer to any service, application, process, or network management function implemented and provided by OSS 210. For example, OSS 210 may provide a service for auditing collected network data for consistency and performance or a service for visualizing various network topologies and communications paths within the network. The service may provide results via presenter 222 in a graphical user interface, which may be viewed, for example, by user 202 on client device 204.

Query manager 220 may then query network management database 230 for data relevant to the received request and retrieve the relevant network management data. In an embodiment, query manager 220 may manage mappings between the service information model used by OSS 210 and the underlying data schema used by network management database 230.

In order to minimize the amount of customization needed for each provider, OSS 210 may make use of an information model template. As the service information model may define generalized base entities for representing a provider's network, the information model template may enable provider-specific entities to be specified without making modifications or additions to the core software of OSS 210. In this manner, the information model template allows for rapid deployment and customization of OSS servers for different service providers managing diverse telecommunications networks.

In an embodiment, the information model template may be formatted as an ASCII-based structured data object and may be defined using a standard or custom markup or domain-specific language, such as but not limited to, XML, JSON, or YANG. The information model template may specify a plurality of provider-specific network entities that extend the base network entities defined by the service information model.

For example, consider a configuration where base entities used to represent the architecture of the network include a subnetwork entity and a container entity, and provider-specific network entities include a wavelength selection switch entity and a cell site router entity. In this example, the information model template may specify a wavelength selection switch entity that extends from a subnetwork entity defined in the service information model, or a cell site router entity that extends from the container entity defined in the service information model. An example information model template is described further with respect to FIGS. 3A and 3B.

Each provider-specific network entity may include information about relationships between the provider-specific network entity and other provider-specific network entities. For example, a particular provider-specific network entity may specify where the entity may reside (e.g., specific layer networks on which the entity may reside), where the entity may be located (e.g., within a cell site router), and/or which entities may be included within the entity (e.g., a cell site may include a cell site router). These relationships may be used for validation and audit purposes to ensure network data conforms to the specified provider-specific network entities and relationships. These example relationships are provided by way of example, and are not intended to be limiting.

In an embodiment, each provider-specific network entity specified in the information model template may also include custom attributes to represent a provider's specific network architecture. For example, a cell site router entity that extends from a container entity may include vendor and model attributes not included by default as part of the service information model. Custom attributes and values may then be stored within network management database 230 and associated with the corresponding base entities without having to modify the database schema or service information model used by OSS 210. This may be accomplished by various methods in different embodiments. For example, in an embodiment, each base entity in the service information model may include a custom attribute data field that stores an array of key-value pairs representing a provider-specific entity's custom attributes and corresponding values. The custom attribute data field may translate to the data schema used by network management database 230 by storing each custom attribute and corresponding value in a database association table.

In an embodiment, the information model template may also specify data collection rules for custom attributes. Data adapter 212 and various data collection processes, as described above, may use these data collection rules to locate and normalize custom attribute values for storage in network management database 230. These collection rules may specify, for example, files in which values are located and parsing rules to obtain the desired values. Example data collection rules are described further with respect to FIGS. 3A and 3B. In an embodiment, parser 214 may read and parse an information model template for a particular service provider. Parser 214 may then provide parsed data collection rules to data adapter 212 and various data collection processes.

In an embodiment, parser 214 may also provide information about provider-specific entities specified by the information model template to service execution manager 216. Service execution manager 216 in turn may execute requested service functionality. In an embodiment, the requested service may be designed to operate on the base entities defined by the service information model. The resulting output from the service may then be customized according to the provider-specific entities specified in the information model template. This enables services and applications to be written with only an understanding of the base entities and their relationships, without knowledge of or reliance on provider-specific network entities.

According to an embodiment, each data entry retrieved from network management database 230 may correspond to a base network entity of the service information model and include a custom entity identifier. The custom entity identifier may be used to correlate the data entry to a provider-specific network entity specified by the information model template. During execution of the requested service, in an embodiment, service execution manager 216 may instantiate one or more the base entities based on the retrieved data entries. Each base entity instance may be correlated to the provider-specific entity based on the custom entity identifier of the data entry for use by service execution manager 216 and presenter 222.

In an embodiment, each retrieved data entry may include custom attributes and attribute values corresponding to the correlated provider-specific network entity. These attributes and attribute values may be linked to each base entity instance. In an embodiment, as described above, the custom attributes and attribute values may be linked by populating a custom attribute data field of each base entity instance with an array of key-value pairs representing the custom attributes and corresponding values. Service execution manager 216 may then operate on the base entity instances to produce a data output. For example, an audit service may produce an audit report or a visualization service may produce a network topology graph for one or more communications paths within the network. The linked custom attributes may be used to customize the data output. For example, a network topology graph may show detailed information for each node according to the corresponding provider-specific entities, rather than the base entities that each node represents in the original data output. In an embodiment, the custom attributes and attribute values may be linked at runtime of the service by service execution manager 216.

Presenter 222 may then prepare the customized data output for presentation and display to an end user, such as user 202. In an embodiment, presenter 222 may present the customized data output in an interactive, graphical user interface, and the interface look and layout may be further customized based on the custom attributes and types of provider-specific network entities. For example, the custom attributes may include presentation characteristics, such as text formatting for a data audit service, line types for a network visualization service, or custom icons, which may be applied to the customized data output by presenter 222 for display to the user.

By making use of an information model template to customize the output of services and applications provided by OSS 210, OSS vendors can rapidly customize an OSS to meet the needs of different service providers, and providers can quickly adapt the OSS based on network infrastructure and service changes. The core software of the OSS may remain unchanged, while the information model template may simply be updated or replaced to account for network architecture differences. In an embodiment, OSS vendors may maintain a library of information model templates directed to specific network technologies that can easily be combined or customized based on each service provider's network and offerings.

Figure 3A:
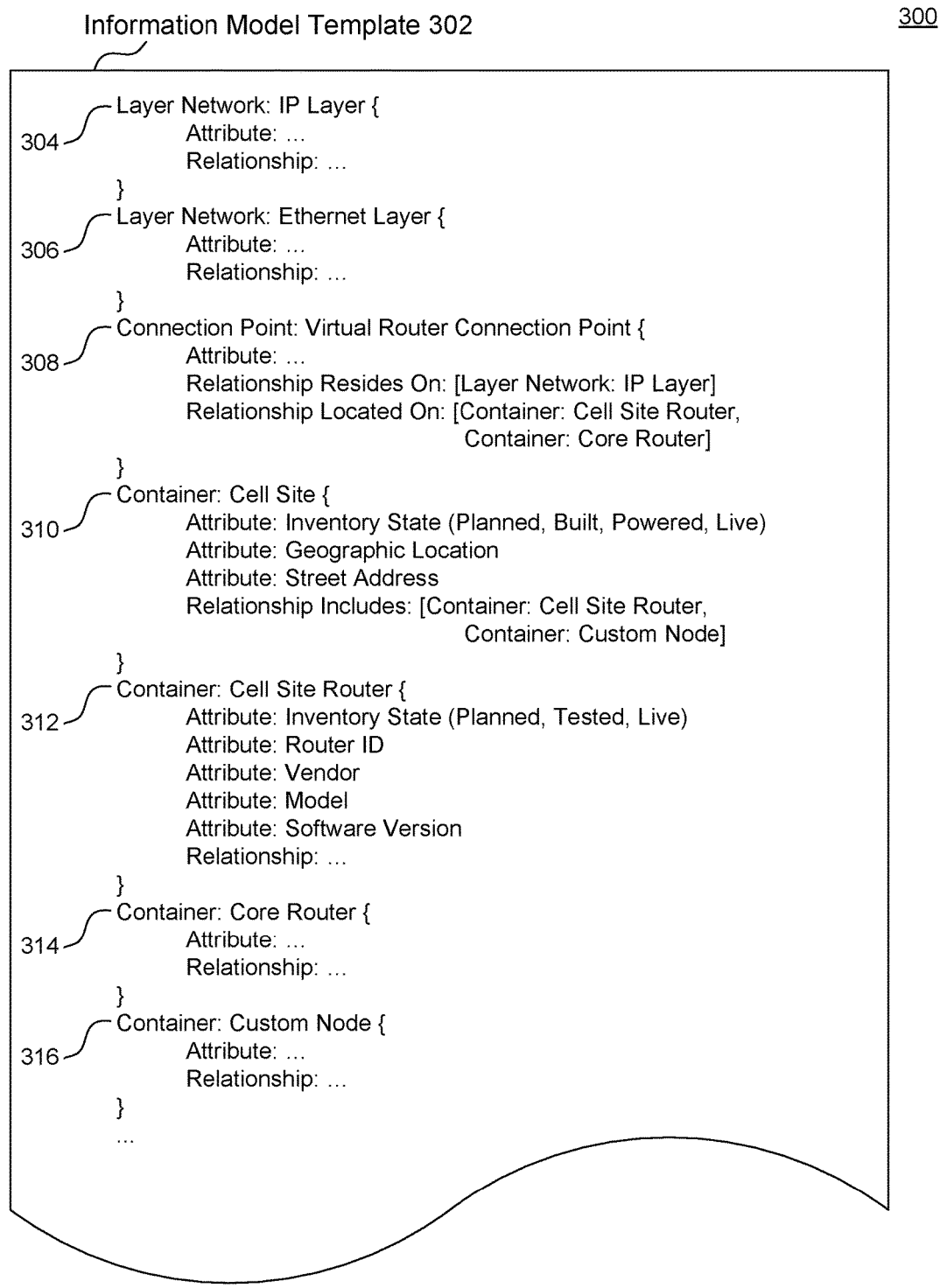
FIGS. 3A and 3B are diagrams illustrating an example information model template, according to an embodiment.
Figure 3B:
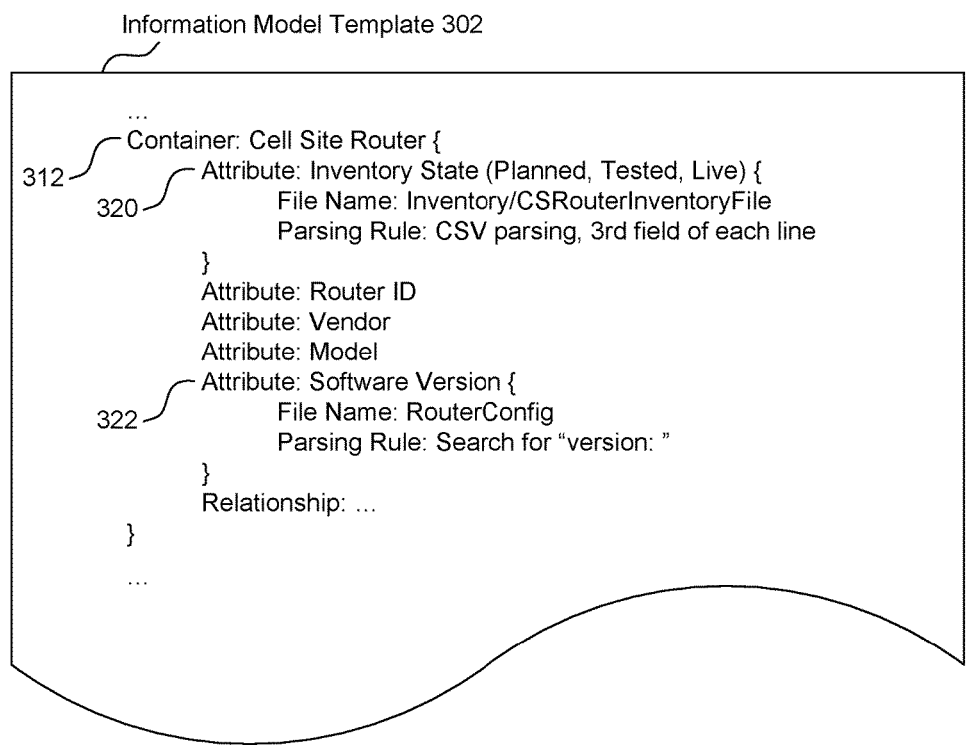

FIGS. 3A and 3B are diagrams illustrating an example information model template 302, according to an embodiment. As shown in FIG. 3A, information model template 302 may include provider-specific network entities 304-316, and each provider-specific entity may include a plurality of custom data attributes. Each provider-specific entity may extend from a base network entity defined by a service information model, such as service information model 100 of FIG. 1.

For example, information model template 302 may include provider-specific network entities such as IP Layer 304, Ethernet Layer 306, Virtual Router Connection Point 308, Cell Site 310, Cell Site Router 312, Core Router 314, and Custom Node 316. Provider-specific entities 304-316 extend from base network entities Layer Network, Connection Point, and Container as defined by the service information model. Each provider-specific entity may include custom data attributes. For example, Cell Site 310 may include Inventory State, Geographic Location, and Street Address attributes, and Cell Site Router 312 may include Inventory State, Router ID, Vendor, Model, and Software Version attributes. As described with respect to FIG. 2, these custom attributes may be linked to the corresponding base network entities and stored in a network management database, such as network management database 230. The names of each provider-specific entity 304-316 may also be represented as a type or similar attribute of the corresponding base entity of the generalized service information model. For instance, Physical Layer may be represented as a type of Layer Network within an OSS, such as OSS 210 of FIG. 2, and stored similarly in the network management database. In an embodiment, provider-specific entities may also extend from other defined provider-specific entities to compact entity definitions within information model template 302.

In an embodiment, each provider-specific network entity 304-316 may also specify relationship information using a plurality of predefined relationships. For example, information model template 302 specifies that Virtual Router Connection Point 308 must reside on an IP Layer 304, and Virtual Router Connection Point 308 must be located on either a Cell Site Router 312 or Core Router 314. Information model template 302 also specifies that Cell Site 310 may include one or more Cell Site Routers 312 and/or Custom Nodes 316. This specified relationship information may be used for validation and audit purposes to ensure network data conforms to information model template 302, as well as to validate consistency within information model template 302. In an embodiment, relationship definitions, such as "Resides On," "Located On," and "Includes," as shown in FIG. 3A, may be stored within an OSS, such as OSS 210 of FIG. 2. These relationship definitions are shown by way of example, and additional relationships may be defined as required to represent provider-specific topologies and constraints. According to a further embodiment, relationship cardinality (e.g., one-to-one, one-to-many, or many-to-many) may also be specified within information model template 302, or as part of the stored relationship definitions.

As described with respect to FIG. 2, an OSS, such as OSS 210, may read and parse information model template when executing a service or application provided by the OSS. The OSS service or application may operate on base objects, such as a Layer Network instance or Container instance, and customize the resulting output according to the provider-specific network entities 304-316 and associated custom attributes. Changes to a service provider's network architecture or deployment to different service providers simply requires modifying information model template 302 to meet the needs of a provider's specific network architecture and offered services. In various embodiments, information model template 302 may be formatted as any ASCII-based structured data object and may be defined using a standard or custom markup or domain-specific language, such as but not limited to, XML, JSON, or YANG.

As shown in FIG. 3B, in an embodiment, information model template 302 may further specify data collection rules for custom attributes to assist with ingestion and normalization of network data. As described with respect to FIG. 2, data may be continuously or periodically collected by various processes implemented within or outside of an OSS, such as OSS 210. This data may be stored in a network management database, such as network management database 230, and used by various services and applications within the OSS. Data collection rules specified in information model template 302 may assist these data collection processes by specifying, for example, files in which custom attribute values are located and parsing rules to obtain the desired values.

For example, data collection rules may be specified for the Inventory State attribute 320 and Software Version attribute 322 of Cell Site Router 312. The data collection rule for Inventory State 320 specifies the name of a file where the attribute value may be found, and a parsing rule specifying that the custom attribute value is located in the third field of each line. Similarly, the data collection rule for Software Version 322 specifies the name of a file where the attribute may be found, and a parsing rule specifying to search for the custom attribute value. These data collection rules may be used by the various data collection processes and a data adapter, such as data adapter 212 of FIG. 2, to locate and normalize custom attribute values for storage in the network management database. In an embodiment, multiple data collection rules may be specified for each custom attribute, for example when values for the attribute may be found in multiple data sources. This may be done, for example, to increase the quality of data stored within the network management database.

Figure 4:
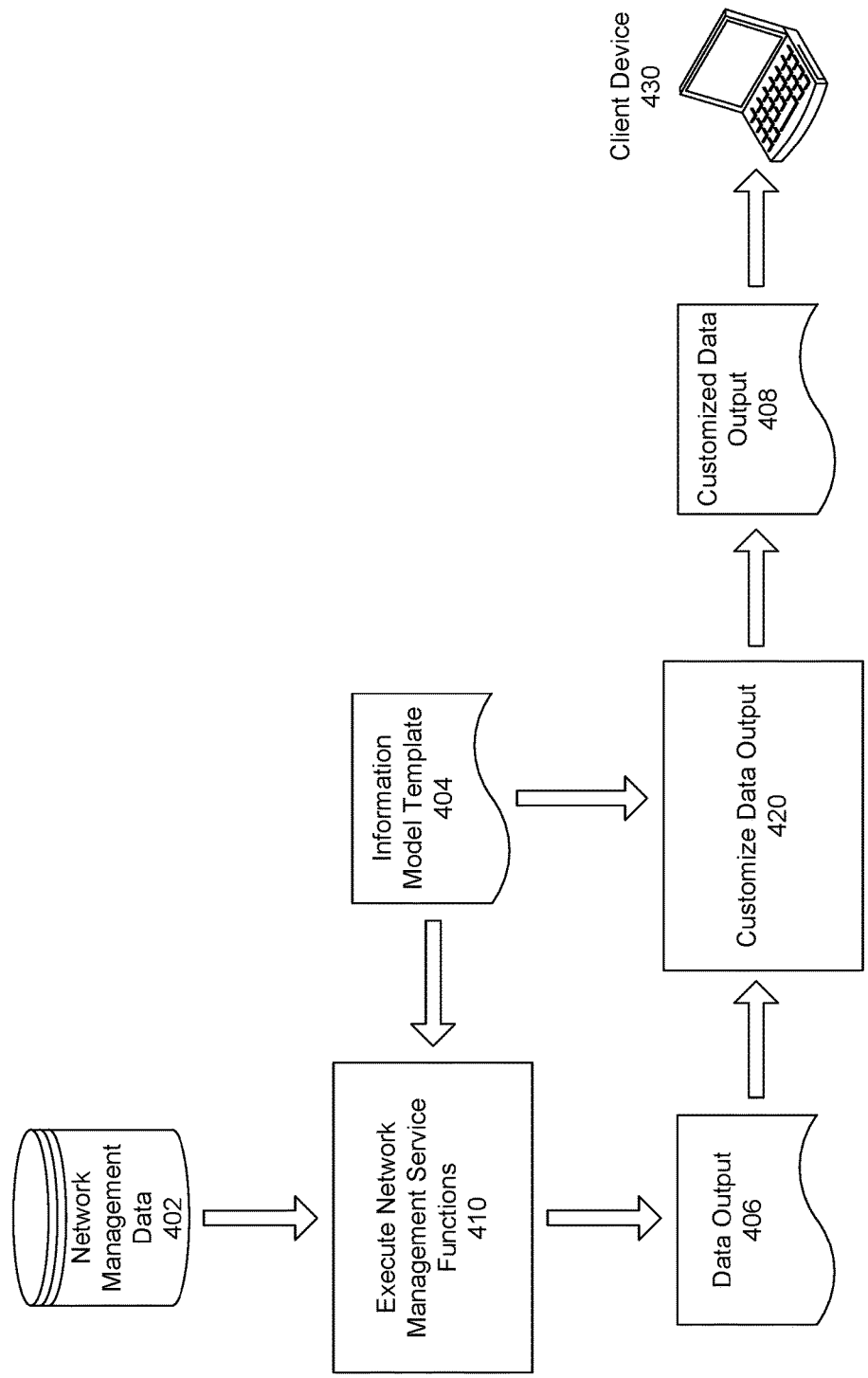
FIG. 4 is a diagram illustrating the flow of data when executing an example network management service, according to an embodiment.

FIG. 4 is a diagram illustrating the flow of data when executing an example network management service, according to an embodiment. As described with respect to FIG. 2, a request may be received from a network operator for a network management service provided by an OSS, such as OSS 210. To fulfill the request, in an embodiment, network management data may be retrieved from network management database 402. Network management data may be similar to that described with respect to network management database 230 of FIG. 2. The retrieved network management data may be correlated to base network entities defined by a service information model, such as service information model 100 of FIG. 1.

The OSS may then read and parse information model template 404. Information model template 404 may be similar to information model template 302 of FIG. 3 and specify provider-specific network entities. The OSS may then execute functions of the network management service at block 410 that manipulate the retrieved network management data to produce data output 406. During execution, custom attributes and attribute values of the provider-specific network entities may be linked to data objects instantiated based on the retrieved network management data. The custom attributes and attribute values may exist as part of specific data entries of the retrieved network management data. In an embodiment, the network management service may be executed by a service execution manager, such as service execution manager 216 of FIG. 2.

Data output 406 may be customized at block 420 based on the provider-specific network entities specified by information model template 404 to produce customized output 408. In an embodiment, data output 406 may be customized by the service execution manager. Customized data output 408 may then be prepared for presentation and transmitted to client device 430 for display to the network operator. In an embodiment, customized data output may be presented in an interactive, graphical user interface by a presenter, such as presenter 222 of FIG. 2.

Example Method

Figure 5:
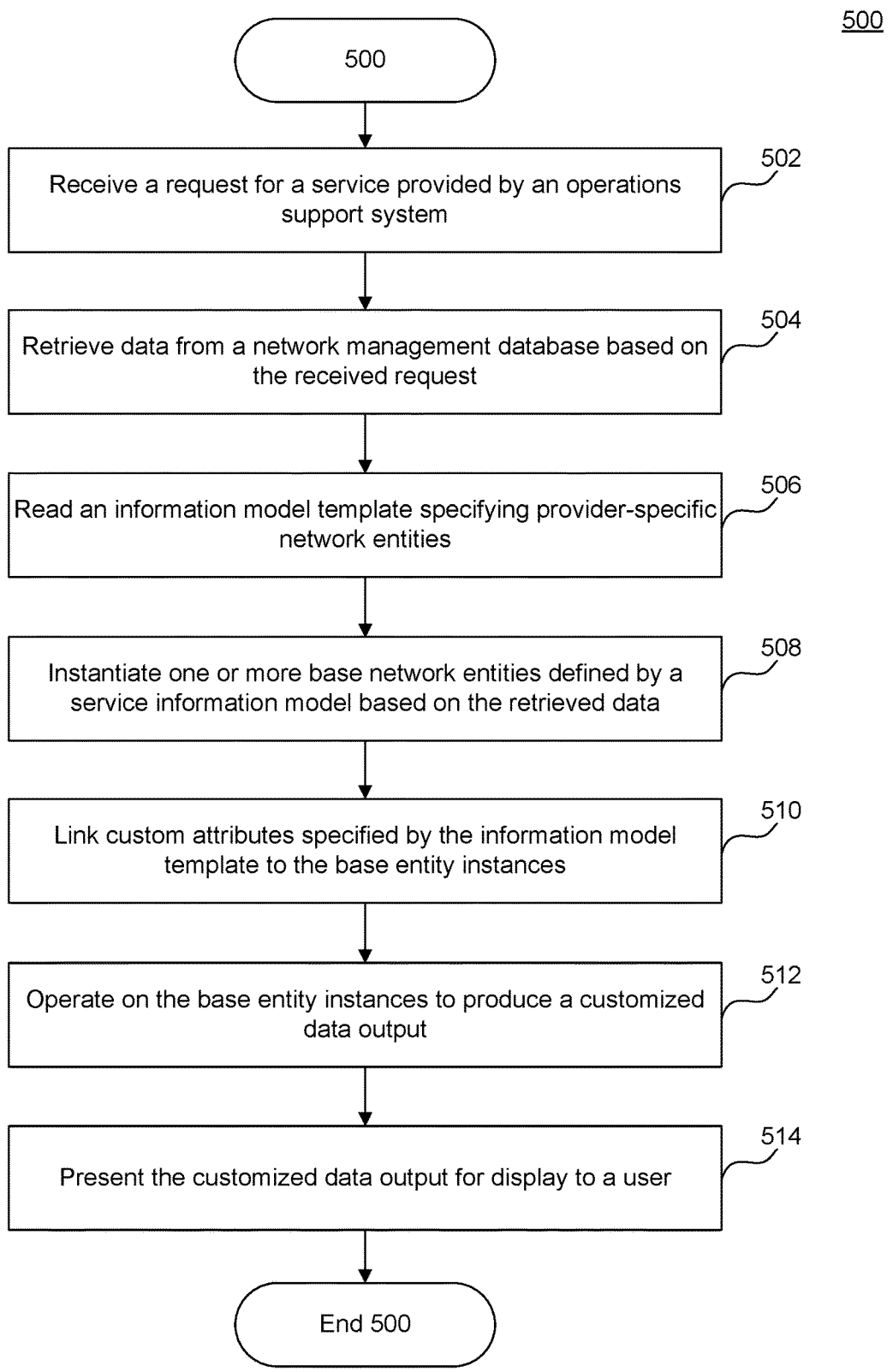
FIG. 5 is an example method for providing a network management service for a telecommunications network, according to an embodiment.

FIG. 5 is an example method for providing a network management service for a telecommunications network, according to an embodiment. Method 500 begins at stage 502 where a request is received for a particular service provided by an operations support system (OSS). In an embodiment, the service may be any service, application, process, or network management function implemented and provided by the OSS. For example, the OSS may provide a service for auditing collected network data for consistency and performance or a service for visualizing various network topologies and communications paths within the network.

At stage 504, data may be retrieved from a network management database based on the received request. The network management database may store a plurality of network management data, such as described with respect to network management database 230 of FIG. 2. In an embodiment, the network management database may implement a data schema that supports storage of network management data according to a service information model, such as service information model 100 of FIG. 1. The service information model may be implemented as a generalized set of base network entities that may be used to represent various network architectures of different service providers.

At stage 506, an information model template may be read and parsed. The information model template may specify provider-specific network entities that represent a provider's network architecture and offered services, such as described with respect to FIGS. 2 and 3. In an embodiment, each provider-specific entity may include a plurality of custom data attributes, and each provider-specific entity may extend from a base network entity defined by the service information model. In an embodiment, the information model template may be formatted as an ASCII-based structured data object and may be defined using a standard or custom markup or domain-specific language, such as but not limited to, XML, JSON, or YANG.

At stage 508, one or more base network entities defined by the service information model may be instantiated based on the data retrieved from the network management database. In an embodiment, data entries of the retrieved network management data correspond to base entities of the service information model, and the corresponding base entities may be instantiated during execution of the network management service. Each base entity instance may also be correlated to a provider-specific network entity specified by the information model template.

At stage 510, the custom attributes specified by the information model template may be linked to the base entity instances. In an embodiment, each data entry of the retrieved network management data may include custom attributes and attribute values corresponding to the correlated provider-specific network entity.

At stage 512, the base entity instances may be operated on to produce a data output. For example, an audit service may produce an audit report or a visualization service may produce a network topology graph for one or more communications paths within the network. The linked custom attributes may be used to customize the data output. For example, a network topology graph may show detailed information for each node according to the corresponding provider-specific entities, rather than the base entities that each node represents in the original data output.

Finally, at stage 514, the customized data output may be presented for display to a user. In an embodiment, the customized data output may be presented in an interactive, graphical user interface, and the interface look and layout may be further customized based on the custom attributes and types of provider-specific network entities.

Figure 6:
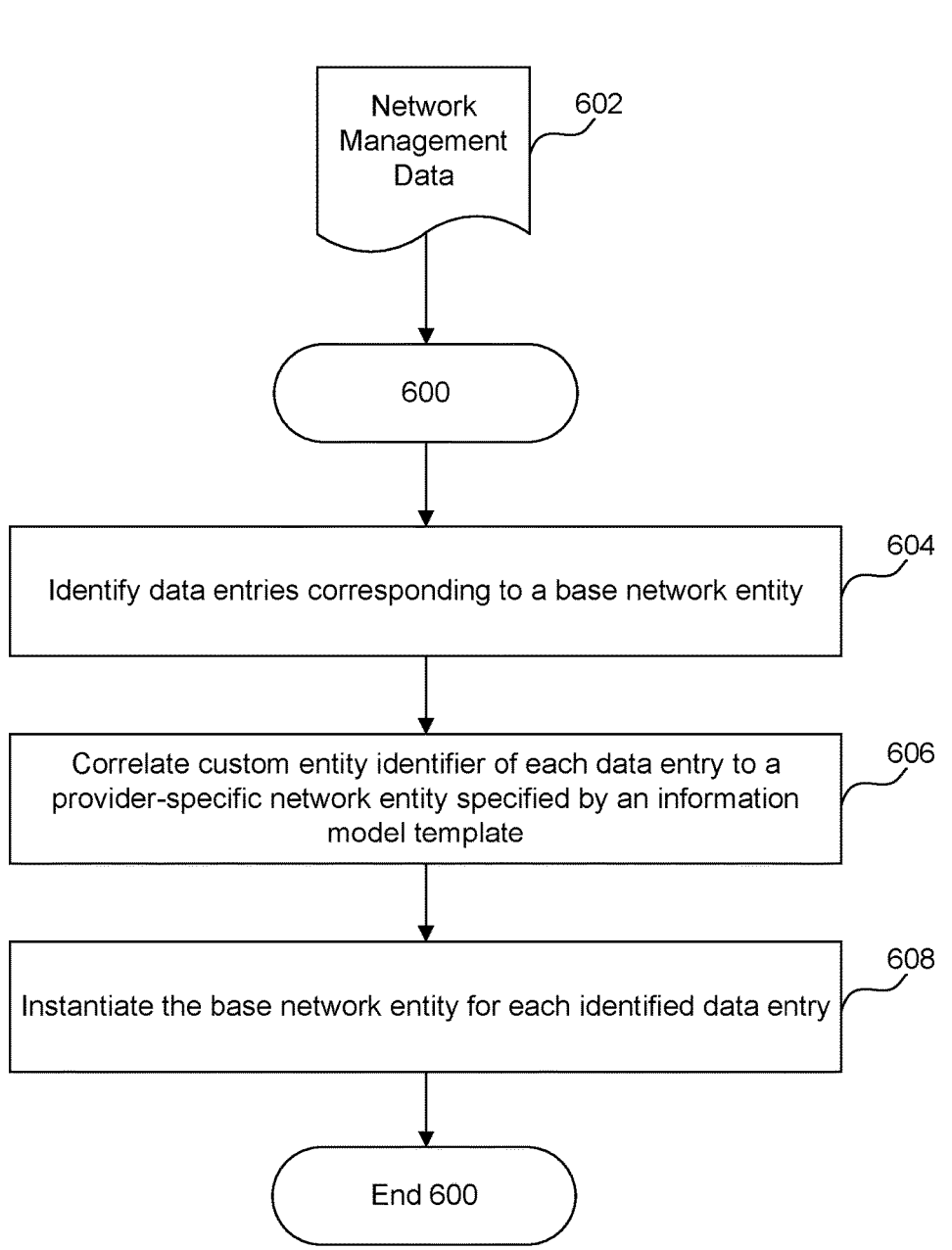
FIG. 6 is an example method for operating on stored network management data with use of an information model template, according to an embodiment.

FIG. 6 is an example method for operating on stored network management data with use of an information model template, according to an embodiment. Method 600 may receive network management data 602 retrieved from a network management database, such as network management database 230 of FIG. 2, as input. In an embodiment, data entries of network management data 602 may correspond to base network entities defined by a service information model. At stage 604, the data entries of network management data 602 corresponding to each base entity of the service information model may be identified. Each data entry may include a custom entity identifier that identifies a provider-specific entity specified by an information model template, such as described with respect to information model template 302 of FIG. 3.

At stage 606, each custom entity identifier of each data entry may be correlated to a customer-specific network entity specified by the information model template. At stage 608, a base network entity may be instantiated for each data entry of network management data 602 and linked to the correlated customer-specific network entity.

Example Computer System

Figure 7:
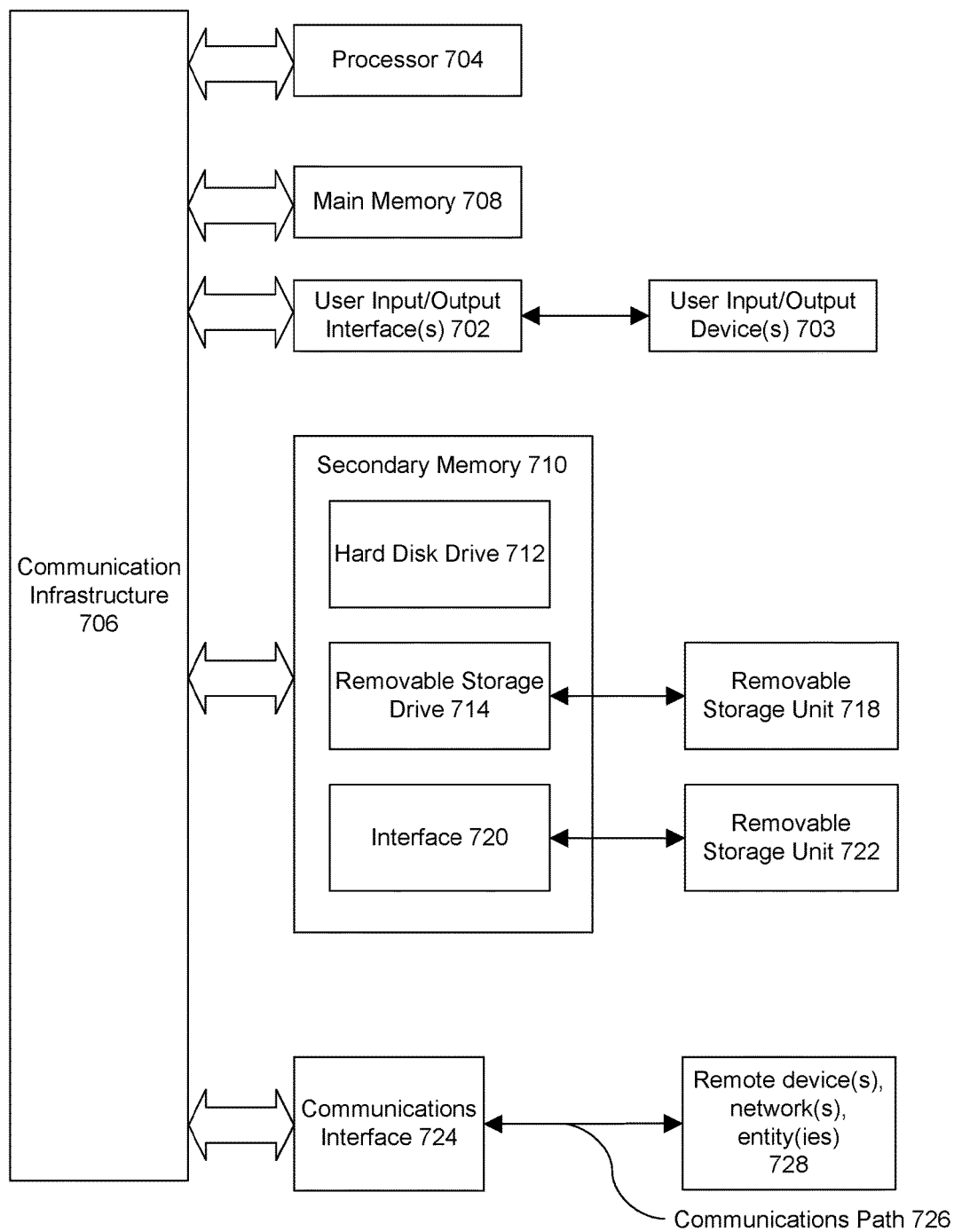
FIG. 7 is a diagram illustrating an example computing device, according to an embodiment.

FIG. 7 is a diagram illustrating an example computing system useful for implementing various embodiments. Various embodiments can be implemented, for example, using one or more well-known computer systems, such as computer system 700. For example, OSS 210 can be implemented on computing system 700. In further examples, aspects of the data flow described with respect to FIG. 4 and the methods of FIGS. 5 and 6 can be implemented on computing system 700. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 may be connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product, program storage device, or computer-readable storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 7. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

What is claimed is:

1. An operations support system for managing a telecommunications network, comprising:
   one or more computing devices;
   a network management database storing a plurality of network management data, wherein the stored data is correlated to a service information model that defines a plurality of base network entities used to represent an architecture of the network;
   a query manager, implemented on the one or more computing devices, configured to:
     receive a request for a service provided by the operations support system; and
     retrieve data from the network management database based on the received request;
   a parser, implemented on the one or more computing devices, configured to read an information model template, the information model template specifying one or more provider-specific network entities that extend the base network entities defined by the service information model, wherein each provider-specific network entity includes one or more custom attributes, and wherein the retrieved data contains data values associated with the custom attributes;
   an execution manager, implemented on the one or more computing devices, configured to:
     instantiate one or more of the base network entities based on the retrieved data, each base entity instance correlated to a provider-specific network entity specified by the information model template;
     link the custom attributes of each provider-specific network entity and associated retrieved data values to the corresponding base entity instances; and
     operate on the base entity instances to produce a data output, wherein the data output is customized based on the linked custom attributes and associated retrieved data values; and
   a presenter, implemented on the one or more computing devices, configured to present the customized data output for display to a user.

2. The system of claim 1, wherein the execution manager is further configured to, for each base network entity:
   identify data entries of the retrieved data corresponding to the base network entity, wherein each data entry includes a custom entity identifier;
   correlate the custom entity identifier to a provider-specific network entity specified by the information model template; and
   instantiate the base network entity for each identified data entry.

3. The system of claim 1, wherein the information model template is formatted as an ASCII-based structured data object.

4. The system of claim 1, wherein the custom attributes and associated retrieved data values are linked to the corresponding base entity instances at runtime of the service.

5. The system of claim 1, wherein each base entity instance includes a custom attribute data field, and wherein the execution manager is further configured to link the custom attributes by populating the custom attribute data field of each base entity instance with an array of key-value pairs representing the corresponding custom attributes and associated retrieved data values.

6. The system of claim 1, wherein the base network entities of the service information model include a container entity that represents a physical or logical grouping of network objects within the network, and wherein an instance of the container entity can contain other container instances.

7. The system of claim 1, wherein one or more of the custom attributes of each provider-specific network entity define presentation characteristics, and wherein the presenter is further configured to apply the presentation characteristics to the customized data output displayed to the user.

8. The system of claim 1, wherein each provider-specific network entity includes relationship information between the provider-specific entity and other provider-specific entities specified in the information model template.

9. The system of claim 1, wherein the information model template includes one or more data collection rules corresponding to the one or more custom attributes.

10. A method for providing network management services for a telecommunications network, comprising:
   receiving a request for a service provided by an operations support system;
   retrieving data from a network management database based on the received request, the network management database storing a plurality of network management data, wherein the stored data is correlated to a service information model that defines a plurality of base network entities used to represent an architecture of the network;
   reading an information model template, the information model template specifying one or more provider-specific network entities that extend the base network entities defined by the service information model, wherein each provider-specific network entity includes one or more custom attributes, and wherein the retrieved data contains data values associated with the custom attributes;
   instantiating one or more of the base network entities based on the retrieved data, each base entity instance correlated to a provider-specific network entity specified by the information model template;
   linking the custom attributes of each provider-specific network entity and associated retrieved data values to the corresponding base entity instances;

operating on the base entity instances to produce a data output, wherein the data output is customized based on the linked custom attributes and associated retrieved data values; and presenting the customized data output for display to a user.

11. The method of claim 10, wherein the instantiating further comprises, for each base network entity:

identifying data entries of the retrieved data corresponding to the base network entity, wherein each data entry includes a custom entity identifier;

correlating the custom entity identifier to a provider-specific network entity specified by the information model template; and instantiating the base network entity for each identified data entry.

12. The method of claim 10, wherein the information model template is formatted as an ASCII-based structured data object.

13. The method of claim 10, wherein the custom attributes and associated retrieved data values are linked to the corresponding base entity instances at runtime of the service.

14. The method of claim 10, wherein each base entity instance includes a custom attribute data field, and wherein the linking further comprises populating the custom attribute data field of each base entity instance with an array of key-value pairs representing the corresponding custom attributes and associated retrieved data values.

15. The method of claim 10, wherein the base network entities of the service information model include a container entity that represents a physical or logical grouping of network objects within the network, and wherein an instance of the container entity can contain other container instances.

16. The method of claim 10, wherein one or more of the custom attributes of each provider-specific network entity define presentation characteristics, and wherein the presenting further comprises applying the presentation characteristics to the customized data output displayed to the user.

17. The method of claim 10, wherein each provider-specific network entity includes relationship information between the provider-specific entity and other provider-specific entities specified in the information model template.

18. The method of claim 10, wherein the information model template includes one or more data collection rules corresponding to the one or more custom attributes.

19. A non-transitory computer-readable storage device having instructions stored thereon that, when executed by at least one computing device, causes the at least one computing device to perform operations comprising:

receiving a request for a service provided by an operations support system;

retrieving data from a network management database based on the received request, the network management database storing a plurality of network management data, wherein the stored data is correlated to a service information model that defines a plurality of base network entities used to represent an architecture of the network;

reading an information model template, the information model template specifying one or more provider-specific network entities that extend the base network entities defined by the service information model, wherein each provider-specific network entity includes one or more custom attributes, and wherein the retrieved data contains data values associated with the custom attributes;

instantiating one or more of the base network entities based on the retrieved data, each base entity instance correlated to a provider-specific network entity specified by the information model template;

linking the custom attributes of each provider-specific network entity and associated retrieved data values to the corresponding base entity instances;

operating on the base entity instances to produce a data output, wherein the data output is customized based on the linked custom attributes and associated retrieved data values; and presenting the customized data output for display to a user.

20. The non-transitory computer-readable storage device of claim 19, wherein the instantiating further comprises, for each base network entity:

identifying data entries of the retrieved data corresponding to the base network entity, wherein each data entry includes a custom entity identifier;

correlating the custom entity identifier to a provider-specific network entity specified by the information model template; and instantiating the base network entity for each identified data entry.

21. The non-transitory computer-readable storage device of claim 19, wherein the information model template is formatted as an ASCII-based structured data object.

22. The non-transitory computer-readable storage device of claim 19, wherein the custom attributes and associated retrieved data values are linked to the corresponding base entity instances at runtime of the service.

23. The non-transitory computer-readable storage device of claim 19, wherein each base entity instance includes a custom attribute data field, and wherein the linking further comprises populating the custom attribute data field of each base entity instance with an array of key-value pairs representing the corresponding custom attributes and associated retrieved data values.

24. The non-transitory computer-readable storage device of claim 19, wherein the base network entities of the service information model include a container entity that represents a physical or logical grouping of network objects within the network, and wherein an instance of the container entity can contain other container instances.

25. The non-transitory computer-readable storage device of claim 19, wherein one or more of the custom attributes of each provider-specific network entity define presentation characteristics, and wherein the presenting further comprises applying the presentation characteristics to the customized data output displayed to the user.

26. The non-transitory computer-readable storage device of claim 19, wherein each provider-specific network entity includes relationship information between the provider-specific entity and other provider-specific entities specified in the information model template.

27. The non-transitory computer-readable storage device of claim 19, wherein the information model template includes one or more data collection rules corresponding to the one or more custom attributes.

* * * * *